United States Patent
Kim et al.

(10) Patent No.: US 12,461,849 B2
(45) Date of Patent: Nov. 4, 2025

(54) MEMORY MAPPING METHOD AND APPARATUS

(71) Applicant: SAMSUNG ELECTRONICS CO., LTD., Suwon-si (KR)

(72) Inventors: Channoh Kim, Suwon-si (KR); Yoojin Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1086 days.

(21) Appl. No.: 17/353,737

(22) Filed: Jun. 21, 2021

(65) Prior Publication Data
US 2022/0269597 A1 Aug. 25, 2022

(30) Foreign Application Priority Data
Feb. 25, 2021 (KR) .................. 10-2021-0025245

(51) Int. Cl.
*G06F 12/02* (2006.01)
*G06F 5/01* (2006.01)
*G06N 3/063* (2023.01)
*G06N 3/10* (2006.01)

(52) U.S. Cl.
CPC ............ *G06F 12/0246* (2013.01); *G06F 5/01* (2013.01); *G06N 3/063* (2013.01); *G06N 3/10* (2013.01); *G06F 2212/221* (2013.01)

(58) Field of Classification Search
CPC .. G06F 12/0246; G06F 5/01; G06F 2212/221; G06F 12/0207; G06F 12/1009; G06N 3/063; G06N 3/10; G06N 3/04; G06N 3/08
USPC ........................................................ 711/170
See application file for complete search history.

(56) References Cited

U.S. PATENT DOCUMENTS

| | | | |
|---|---|---|---|
| 10,089,115 B2 | 10/2018 | Ray et al. | |
| 2017/0200094 A1 | 7/2017 | Bruestle et al. | |
| 2019/0156185 A1 | 5/2019 | Li et al. | |
| 2019/0163904 A1* | 5/2019 | Chung | G06F 21/566 |
| 2020/0082215 A1 | 3/2020 | Aliabadi et al. | |
| 2020/0174686 A1* | 6/2020 | Song | G06F 3/0673 |
| 2020/0202198 A1* | 6/2020 | Lee | G06N 3/08 |

FOREIGN PATENT DOCUMENTS

| | | |
|---|---|---|
| CN | 109710309 A | 5/2019 |
| KR | 10-2015-0101870 A | 9/2015 |
| KR | 10-2018-0117017 A | 10/2018 |

OTHER PUBLICATIONS

Korean Office Action issued on Jan. 21, 2025 in corresponding Korean Patent Application No. 10-2021-0025245. (2 pages in English and 7 pages in Korean).

* cited by examiner

*Primary Examiner* — Jared I Rutz
*Assistant Examiner* — Wei Ma
(74) *Attorney, Agent, or Firm* — NSIP Law

(57) ABSTRACT

A memory mapping method includes storing a feature map including a plurality of sets of data used for a neural network operation in a memory, shifting a position of a portion of the data included in the feature map that is stored in the memory based on a parameter of the neural network operation, and outputting data requested by the neural network operation from the feature map in which the position of the portion is shifted based on a memory bandwidth.

19 Claims, 6 Drawing Sheets

| 510 — | 0 | 1 | 2 | 3 | 4 | 5 | 6 | 7 |
| 530 — | 13 | 14 | 15 | 8 | 9 | 10 | 11 | 12 |
| 550 — | 18 | 19 | 20 | 21 | 22 | 23 | 16 | 17 |
| | 31 | 24 | 25 | 26 | 27 | 28 | 29 | 30 |
| | 36 | 37 | 38 | 39 | 32 | 33 | 34 | 35 |
| | 41 | 42 | 43 | 44 | 45 | 46 | 47 | 40 |
| | 54 | 55 | 48 | 49 | 50 | 51 | 52 | 53 |
| | 59 | 60 | 61 | 62 | 63 | 56 | 57 | 58 |

FIG. 5

MEMORY MAPPING METHOD AND APPARATUS

CROSS-REFERENCE TO RELATED APPLICATIONS

This application claims the benefit under 35 USC § 119(a) of Korean Patent Application No. 10-2021-0025245 filed on Feb. 25, 2021, in the Korean Intellectual Property Office, the entire disclosure of which is incorporated herein by reference for all purposes.

BACKGROUND

1. Field

The following description relates to a memory mapping method and apparatus.

2. Description of Related Art

When a typical neural processor stores a feature map in a static random-access memory (SRAM), this feature map may be stored in a linear address space.

In the process of an operation between the feature map and a kernel in the SRAM of an arbitrary size using a memory managing method of the typical neural processor, a bank conflict may occur, which may limit the size of data to be transmitted for one cycle.

Accordingly, an additional cycle that is unnecessary may be required to process the given data for performing a neural network operation.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a memory mapping method includes storing, in a memory, a feature map including a plurality of sets of data used for a neural network operation, shifting a position of a portion of the data included in the feature map that is stored in the memory based on a parameter of the neural network operation, and outputting data requested by the neural network operation from the feature map in which the position of the portion of the data is shifted based on a memory bandwidth.

The shifting may include shifting the position of the portion of the data by a different interval based on a position of a row of the feature map or a position of a column of the feature map.

The shifting may include shifting the position of the portion of the data by performing padding on a row or a column of the feature map.

The shifting of the position of the portion of the data by performing padding on the row or the column of the feature map may include performing padding based on the memory bandwidth and a kernel size of the neural network operation.

The shifting may include shifting data in a row or a column of the feature map by a predetermined interval.

The shifting of the data in the row or the column of the feature map by the predetermined interval may include determining the interval based on the memory bandwidth, a kernel size of the neural network operation, and a size of the feature map.

The shifting may include shifting the position of the portion of the data based on a lookup table that stores a degree of shifting in a row or a column of the feature map.

The shifting of the position of the portion of the data based on the lookup table that stores a degree of shifting in the row or the column of the feature map may include shifting the position of the portion of the data based on coordinates of the sets of the data and a special purpose register.

The shifting includes shifting the position of the portion of the data based on a stride corresponding to a width direction of the feature map, a height direction of the feature map, or a channel direction of the feature map.

In another general aspect, a memory mapping apparatus includes a memory configured to store therein a feature map including a plurality of sets of data used for a neural network operation, and a processor configured to shift a position of a portion of the data included in the feature map that is stored in the memory based on a parameter of the neural network operation, and to output data requested by the neural network operation from the feature map in which the position of the portion of the data is shifted based on a memory bandwidth.

The processor may shift the position of the portion of the data by a different interval based on a position of a row of the feature map or a position of a column of the feature map.

The processor may shift the position of the portion of the data by performing padding on a row or a column of the feature map.

The processor may perform padding based on the memory bandwidth and a kernel size of the neural network operation.

The processor may shift data in a row or a column of the feature map by a predetermined interval.

The processor may determine the interval based on the memory bandwidth, a kernel size of the neural network operation, and a size of the feature map.

The processor may shift the position of the portion of the data based on a lookup table that stores a degree of shifting in a row or a column of the feature map.

The processor may shift the position of the portion of the data based on coordinates of the sets of the data and a special purpose register.

The processor may shift the position of the portion of the data based on a stride corresponding to a width direction of the feature map, a height direction of the feature map, and a channel direction of the feature map.

Other features and aspects will be apparent from the following detailed description, the drawings, and the claims.

BRIEF DESCRIPTION OF THE DRAWINGS

FIG. 5 illustrates another example of shifting data of a feature map stored in a memory.

Figure 1:
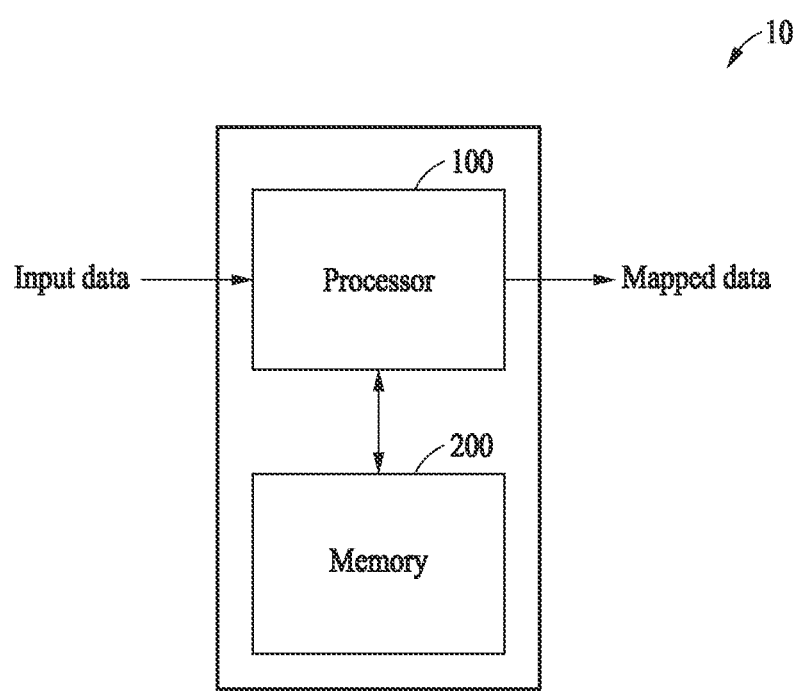
FIG. 1 illustrates an example of a memory mapping apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

In addition, terms such as first, second, A, B, (a), (b), and the like may be used herein to describe components. Each of these terminologies is not used to define an essence, order, or sequence of a corresponding component but used merely to distinguish the corresponding component from other component(s).

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments.

Hereinafter, examples will be described in detail with reference to the accompanying drawings, and like reference numerals in the drawings refer to like elements throughout.

Figure 2:
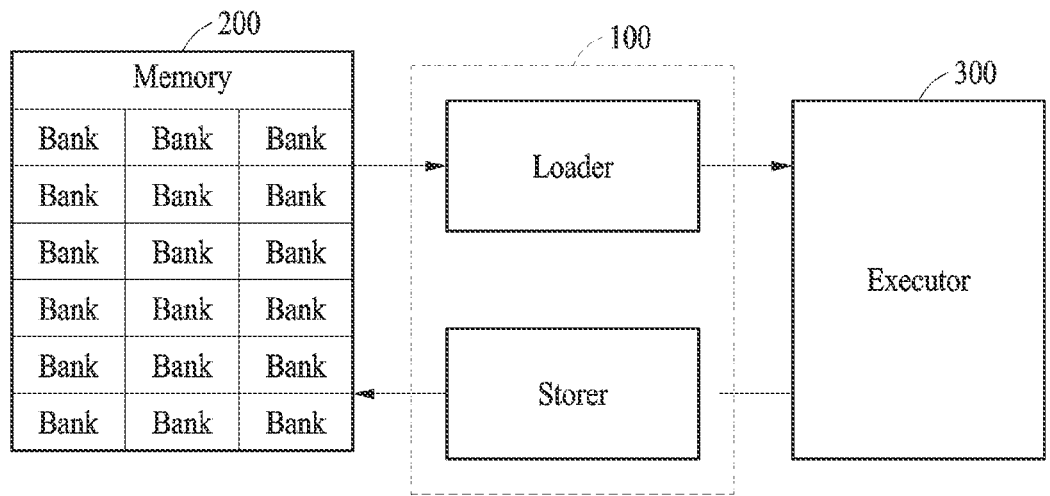
FIG. 2 illustrates an example of an operation of a processor illustrated in FIG. 1.

FIG. 1 illustrates an example of a memory mapping apparatus, and FIG. 2 illustrates an example of an operation of a processor illustrated in FIG. 1.

Referring to FIGS. 1 and 2, a memory mapping apparatus 10 may process input data and output mapped data. The memory mapping apparatus 10 may include a processor 100 and a memory 200.

The memory mapping apparatus 10 may store the input data in the memory 200. The memory mapping apparatus 10 may change a position of the input data stored in the memory 200 and output the mapped data.

The memory mapping apparatus 10 may process the input data to perform a neural network operation.

A neural network (or an artificial neural network) may include a statistical learning or training algorithm that simulates biological neurons in machine learning and cognitive science. The neural network may refer to a model with a problem-solving ability, where artificial neurons (nodes) forming the network through synaptic connections change a connection strength of synapses through training.

A neuron of the neural network may include a combination of weights and biases. The neural network may include one or more layers that have one or more neurons or nodes. The neural network may infer a result to be predicted from an input by changing a weight of the neuron through training.

The neural network may include a deep neural network (DNN). The neural network may include a convolutional neural network (CNN), a recurrent neural network (RNN), a perceptron, a multilayer perceptron, a feed forward (FF) network, a radial basis network (RBF), a deep feed forward (DFF) network, a long short-term memory (LSTM), a gated recurrent unit (GRU), an autoencoder (AE), a variational autoencoder (VAE), a denoising autoencoder (DAE), a sparse autoencoder (SAE), a Markov chain (MC), a Hopfield network (HN), a Boltzmann machine (BM), a restricted Boltzmann machine (RBM), a deep belief network (DBN), a deep convolutional network (DCN), a deconvolutional network (DN), a deep convolutional inverse graphics network (DCIGN), a generative adversarial network (GAN), a liquid state machine (LSM), an extreme learning machine (ELM), an echo state network (ESN), a deep residual network (DRN), a differentiable neural computer (DNC), a neural turning machine (NTM), a capsule network (CN), a Kohonen network (KN), and an attention network (AN).

The memory mapping apparatus 10 may be implemented in a form of a mobile terminal. For example, the memory mapping apparatus 10 may be implemented in an Internet of Things (IoT) device, a machine-type communications device, a portable electronic device, or the like.

The portable electronic device may be implemented in a laptop computer, a mobile phone, a smartphone, a tablet personal computer (PC), a mobile Internet device (MID), a personal digital assistant (PDA), an enterprise digital assistant (EDA), a digital still camera, a digital video camera, a portable multimedia player (PMP), a personal or portable navigation device (PND), a handheld game console, an e-book, and a smart device. For example, the smart device may be implemented in a smartwatch or a smart band.

The input data may include data related to the neural network operation. For example, the input data may include a model parameter of the neural network or the feature map.

The feature map may include a plurality of sets of data. For example, the feature map may include a plurality of channels as a two-dimensional (2D) matrix.

The processor 100 may process the data stored in the memory 200. The processor 100 may execute a computer-readable code (e.g., software) stored in the memory 200 or instructions induced by the processor 100.

The processor 100 may be a hardware-implemented data processing device having a physically structured circuit for executing desired operations. For example, the desired operations may include instructions or a code in a program.

For example, the hardware-implemented data processing device may include a microprocessor, a central processing unit (CPU), a processor core, a multi-core processor, a multiprocessor, an application-specific integrated circuit (ASIC), and a field-programmable gate array (FPGA).

The processor 100 may receive a parameter related to the neural network operation and the feature map. The processor 100 may store the feature map that includes a plurality of sets of data used for the neural network operation in the memory 200.

The processor 100 may shift a position of a portion of the sets of data included in the feature map based on the parameter related to the neural network operation.

For example, the processor 100 may shift positions of some sets of the data by different intervals based on a position of a row or column of the feature map. The processor 100 may shift the position of the portion of the data based on a stride corresponding to a width direction of the feature map, a height direction of the feature map, or a channel direction of the feature map.

The processor 100 may shift the position of the portion of the data by performing padding of the row or column of the feature map. The processor 100 may perform the padding based on a memory bandwidth and a kernel (or a filter) size of the neural network operation.

The processor 100 may shift data in the row or column of the feature map by a predetermined interval within the row or column. The processor 100 may determine the interval based on the memory bandwidth, the kernel size of the neural network operation, and the size of the feature map.

The processor 100 may shift the position based on a lookup table that stores a degree of shifting in the row or column of the feature map. The processor 100 may shift the position based on data coordinates and a special purpose register.

The processor 100 may output data requested by the neural network operation from the feature map in which the position of the portion of the data is shifted based on the memory bandwidth of the memory 200.

The processor 100 may include a loader and a storer. The processor 100 may retrieve the data stored in the memory 200 and perform the neural network operation using an executor 300.

The loader may output the data stored in the memory 200 to the executor 300, and the storer may store, in the memory 200, the data on which the neural network operation is performed in the executor 300.

The processor 100 may shift and output the position of the sets of the data included in the feature map using the loader and the storer.

The memory 200 may store the feature map including the sets of the data used for the neural network operation. The memory 200 may store the data shifted by the processor 100.

The memory 200 may store instructions (or a program) executable by the processor 100. For example, the instructions may include instructions for executing an operation of the processor 100 and/or instructions for performing an operation of each component of the processor 100.

The memory 200 may be implemented in a volatile or non-volatile memory device.

The volatile memory device may be implemented as a dynamic random-access memory (DRAM), a static RAM (SRAM), a thyristor RAM (T-RAM), a zero capacitor RAM (Z-RAM), or a twin transistor RAM (TTRAM).

The non-volatile memory device may be implemented as an electrically erasable programmable read-only memory (EEPROM), a flash memory, a magnetic RAM (MRAM), a spin-transfer torque-MRAM (STT-MRAM), a conductive bridging RAM (CBRAM), a ferroelectric RAM (FeRAM), a phase change RAM (PRAM), a resistive RAM (RRAM), a nanotube RRAM, a polymer RAM (PoRAM), a nano-floating gate memory (NFGM), a holographic memory, a molecular electronic memory device, or an insulator resistance change memory.

Figure 3:
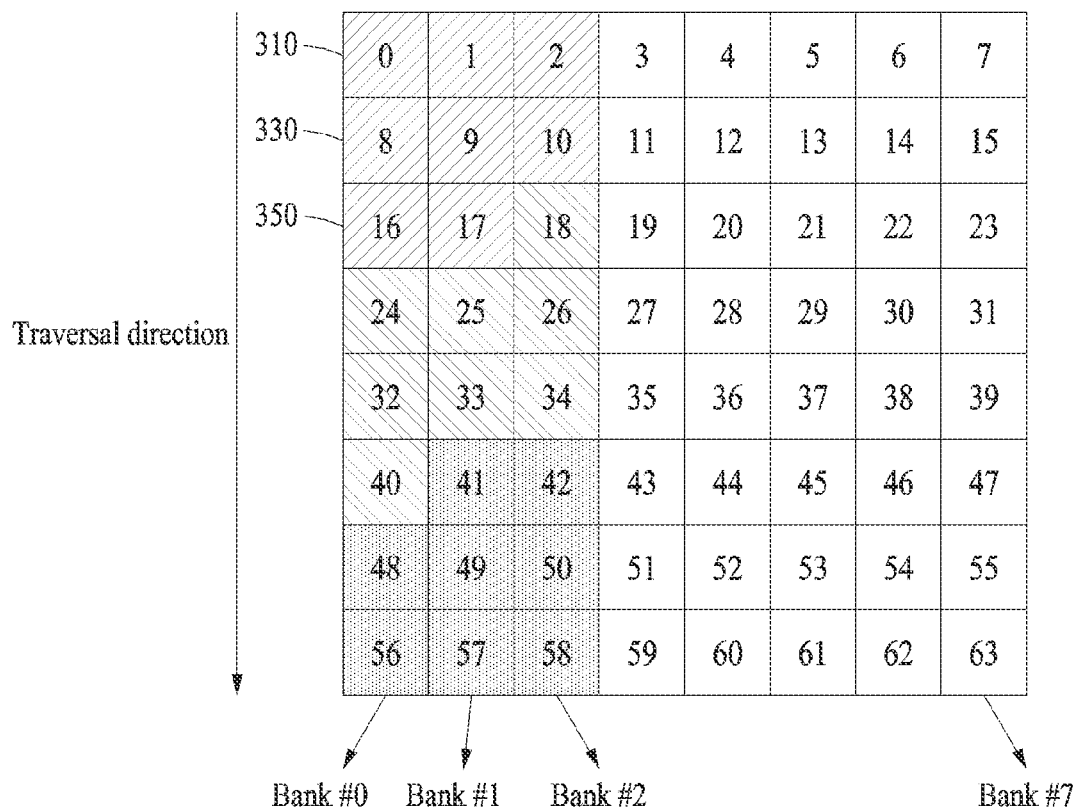
FIG. 3 illustrates an example of a memory in which a feature map is stored.

FIG. 3 illustrates an example of a memory in which a feature map is stored.

Referring to FIG. 3, the processor 100 may perform a neural network operation using data stored in the memory 200. The processor 100 may store a feature map including a plurality of sets of data in the memory 200.

The processor 100 may store the feature map in the memory 200 using a naïve scheme. For example, the processor 100 may store the feature map in the memory 200 as expressed in Equation 1. The processor 100 may store the data included in the feature map in an address of Equation 1.

$$\text{Address} = fm.z * \text{stride}.z + fm.y * \text{offset}.y + fm.x * \text{stride}.x \quad \text{Equation 1:}$$

In Equation 1, fm.x denotes an x-axis coordinate of the feature map, fm.y denotes a y-axis coordinate of the feature map, and fm.z denotes a z-axis coordinate of the feature map. An x-axis direction may indicate a width direction of the feature map, a y-axis direction may indicate a height direction of the feature map, and a z-axis direction may indicate a channel direction of the feature map.

In Equation 1, stride.x denotes a stride in the x-axis direction, stride.y denotes a stride in the y-axis direction, and stride.z denotes a stride in the z-axis direction.

For example, stride.x may be 1 byte, stride.y may be a width of the feature map, and stride.z may be a value obtained by multiplying the width of the feature map and a height of the feature map.

The processor 100 may store the feature map as illustrated in FIG. 3. In the example of FIG. 3, one box indicates 1 byte, and a number in the box indicates a memory address. In the example of FIG. 3, a plurality of banks includes bank #0, #1, #2 . . . , #7.

The processor 100 may perform a convolution operation. The processor 100 may search the data in a traversal direction of the memory 200. That is, the processor 100 may request data in a direction from a row 310 to a row 330 and a row 350 of the memory 200 based on a memory bandwidth and a kernel size. The processor 100 may also request data in a direction from bank #0 to bank #7.

For example, when the kernel size of the convolution operation is 3×3, and the memory bandwidth is 8 bytes/cycle, the processor 100 may request sets of data in the same hatched regions in the feature map illustrated in FIG. 3.

In this example, the processor 100 may request data in addresses 0, 1, 2, 8, 9, 10, 16 and 17 on cycle 0, and request data in addresses 18, 24, 25, 26, 32, 33, 34 and 40 on cycle 1.

Figure 4:
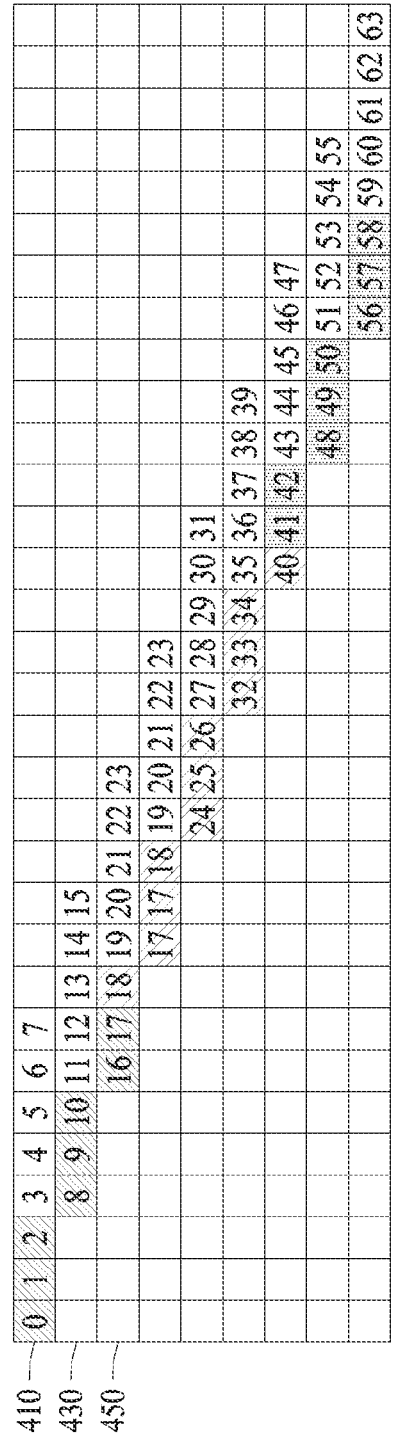
FIG. 4 illustrates an example of shifting data of a feature map stored in a memory.

FIG. 4 illustrates an example of shifting data of a feature map stored in a memory.

Referring to FIG. 4, the processor 100 may shift a position of a portion of sets of data included in a feature map that is stored in the memory 200 based on a parameter related to a neural network operation. The processor 100 may shift the data stored in the memory 200 and traverse the shifted data, using a control register.

The processor 100 may shift the position of the portion of the data based on a stride corresponding to a width direction of the feature map, a height direction of the feature map, or a channel direction of the feature map.

The processor 100 may shift the portion of the data by a different interval based on a position of a row or column of the feature map. The processor 100 may prevent a bank conflict from occurring during the traversal of the feature map by applying a different shift amount to each row or column of the feature map.

The processor 100 may shift the position of the portion of the data by performing padding on the row or column of the feature map. The processor 100 may perform padding based on a memory bandwidth and a kernel size of the neural network operation.

The processor 100 may shift the data included in the feature map using Equation 2.

$$\text{Address} = fm.z * \text{stride}.z + fm.y * \text{stride}.y + (fm.x + fm.y * \text{cell}(\text{SRAM\_BW/kernel\_height})) * \text{stride}.x \qquad \text{Equation 2:}$$

In Equation 2, SRAM_BW denotes the memory bandwidth, and kernel_height denotes a height of a kernel. For example, the memory bandwidth may be 8 bytes/cycle, and the height of the kernel may be 3. The example expressed in Equation 2 may be where padding is performed with different amounts in a row direction of the feature map or the memory 200. Such padding may also be performed with different amounts in a column direction of the feature map or the memory 200.

Referring to Equation 2, the processor 100 may perform padding based on a ceiling function value that is obtained by dividing the memory bandwidth by the kernel size (e.g., the height of the kernel).

The processor 100 may sequentially store data 0, 1, 2, 3, 4, 5, 6 and 7 of a first row 410 as illustrated in FIG. 4.

The processor 100 may perform padding on a second row 430. In the example of FIG. 4, the processor 100 may perform padding on a memory space of 3 boxes (or 3 bytes) of the second row 430. The processor 100 may perform padding on a memory space of 6 boxes (or 6 bytes) of a third row 450. The processor 100 may perform padding on remaining rows as described above.

The processor 100 may prevent a bank conflict by the shifting and padding described above.

FIG. 5 illustrates another example of shifting data of a feature map stored in a memory.

Referring to FIG. 5, the processor 100 may shift data in a row or column of a feature map by a predetermined interval within the row or column. The processor 100 may determine the interval based on a memory bandwidth, a kernel size of a neural network operation, and a size of the feature map.

The processor 100 may shift the data as expressed in Equation 3.

$$\text{Address} = fm.z * \text{stride}.z + fm.y * \text{stride}.y + ((fm.x + fm.y * \text{cell}(\text{SRAM\_BW/kernel\_height})) * \text{stride}.x) \% fm\_\text{width} \qquad \text{Equation 3:}$$

Referring to Equation 3, the processor 100 may shift a position of a portion of sets of data based on a width of the feature map and a ceiling function value that is obtained by dividing the memory bandwidth by the kernel size (e.g., a height of a kernel).

In the example of FIG. 5, the processor 100 may sequentially store data 0, 1, 2, 3, 4, 5, 6 and 7 of a first row 510. The processor 100 may shift the position of the data by an interval of 3 boxes (or 3 bytes) in a second row 530. Thus, an order of data to be stored in the second row 530 may be 13, 14, 15, 8, 9, 10, 11 and 12.

The processor 100 may also shift the position of the data by an interval of 6 boxes in a third row 550, as expressed in Equation 3. That is, an order of data to be stored in the third row 550 may be 18, 19, 20, 21, 22, 23, 16 and 17.

The processor 100 may shift the position of the portion of the data based on a lookup table that stores a degree of shifting in the row or column of the feature map. The processor 100 may shift the position of the portion of the data based on data coordinates and a special purpose register.

The processor 100 may shift the position of the portion of the data based on the lookup table as expressed in Equation 4.

$$\text{Address} = fm.z * \text{stride}.z + fm.y * \text{stride}.y + ((fm.x + \text{LUT}[\text{mask}(fm.y)]) * \text{stride}.x) \qquad \text{Equation 4:}$$

The processor 100 may use the lookup table to calculate a shift amount. A value stored in an entry of the lookup table may be previously stored offline.

The processor 100 may use a mask function to search for the entry of the lookup table. The processor 100 may obtain a value of the mask function by performing an AND operation on the coordinates of the feature map and an output of the special purpose register. As expressed in Equations 2 and 3, the processor 100 may use the lookup table to shift the data included in the feature map.

Equations 1 to 4 may be applicable to both cases in which a direction of searching the feature map is a horizontal (or a width) direction or a vertical (or a height) direction.

The processor 100 may change a calculation of an address of the memory 200 in which the data included in the feature map is stored using Equations 2 through 4, and thus prevent a bank conflict that may occur when there is a request for data stored in the memory 200.

Figure 6:
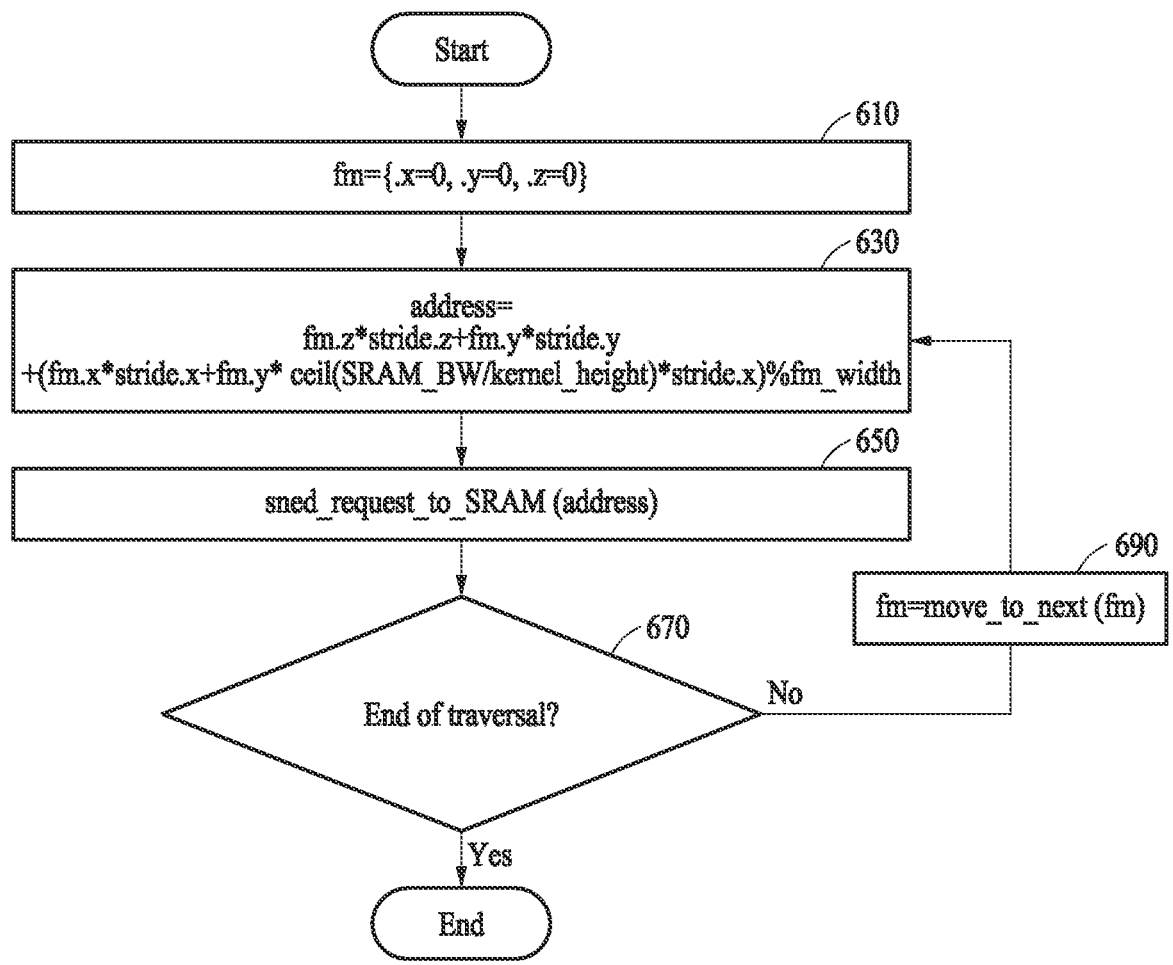
FIG. 6 illustrates an example of a flow of a request for data of an entire input feature map.

FIG. 6 illustrates an example of a flow of a request for data of an entire feature map.

Referring to FIG. 6, in operation 610, the processor 100 inputs 0 to fm.x, fm.y and fm.z. A coordinate <0, 0, 0> may indicate a start position from which a search in the memory 200 is started. The processor 100 may shift data while searching the data from data corresponding to the coordinate <0, 0, 0> up to an end of the feature map.

In operation 630, the processor 100 shifts the data of the feature map stored in the memory 200 according to Equation 3. Although the example of FIG. 6 is described based on Equation 3, the search using a shifting method as expressed in Equations 2 or 4 may also be used.

In operation 650, the processor 100 requests the memory 200 for the data of which a position is shifted in the feature map. The processor 100 may request the memory 200 for the data based on an address of the data shifted according to Equations 2 to 4.

In operation 670, the processor 100 determines whether an end of a traversal is reached while searching the data stored in the memory 200.

The processor 100 may complete the search in response to a determination that the end of the traversal is reached. When it is not the end of the traversal, the processor 100 may receive a next feature map and perform operation 630 of shifting on data in the next feature map. In operation 690, a move_to_next (fm) operation is changed based on a traversal direction and a size of the feature map, and a kernel size.

The operations described above with reference to FIG. 6 may be performed by the loader illustrated in FIG. 2. For example, when shifted data is stored in the memory 200 as described above in the example of FIG. 6, the data to be requested and processed by the processor 100 for each cycle to perform a neural network operation may be as indicated in Table 1.

Table 1 indicates sets of data that are requested for each cycle by the processor 100 and are then in a response to the request in a case in which the data is stored in the memory 200 using Equation 1 or 3.

Table 1 also indicates an operation based on a cycle level with a memory bandwidth of 8 bytes/cycle.

TABLE 1

| Cycle | Equation 1 | | Equation 3 | |
|---|---|---|---|---|
| | Request | Response | Request | Response |
| 0 | 0, 1, 2, 10, 11, 12, 20, 21 | | 0, 1, 2, 10, 11, 12, 20, 21 | |
| 1 | 22, 30, 31, 32, 40, 41, 42, 50 | 0, 1, 2 | 22, 30, 31, 32, 40, 41, 42, 50 | 0, 1, 2, 10, 11, 12, 20, 21 |
| 2 | 51, 52, 60, 61, 62, 70, 71, 72 | 10, 11, 12 | 51, 52, 60, 61, 62, 70, 71, 72 | 22, 30, 31, 32, 40, 41, 42, 50 |
| 3 | | 20, 21, 22 | | 51, 52, 60, 61, 62, 70, 71, 72 |
| 4 | | 30, 31, 32 | | |
| 5 | | 40, 41, 42 | | |
| 6 | | 50, 51, 52 | | |
| 7 | | 60, 61, 62 | | |
| 8 | | 70, 71, 72 | | |

Referring to Table 1, through a method of storing a feature map according to Equation 1, data may be loaded throughout a total of 8 cycles due to an influence of a bank conflict despite the memory bandwidth of 8 bytes/cycle. In contrast, through a method of storing a feature map according to Equation 3, data may be loaded only with 3 cycles using a full memory bandwidth.

Figure 7:
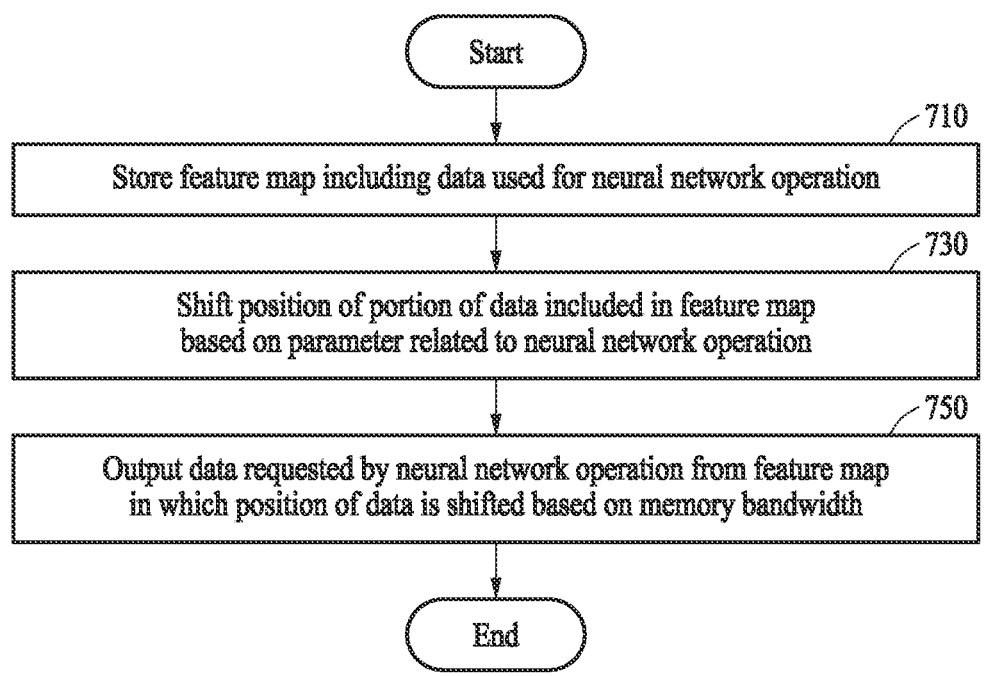
FIG. 7 illustrates an example of a flow of operations of the memory mapping apparatus illustrated in FIG. 1.

FIG. 7 illustrates an example of a flow of operations of the memory mapping apparatus 10 illustrated in FIG. 1.

Referring to FIG. 7, in operation 710, the memory 200 stores a feature map including a plurality of sets of data used for a neural network operation in the memory 200.

In operation 730, the processor 100 shifts a position of a portion of the sets of the data included in the feature map stored in the memory 200 based on a parameter related to the neural network operation.

For example, the processor 100 may shift the portion of the data by a different interval based on a row or column of the feature map. The processor 100 may shift the position of the portion of the data based on a stride corresponding to a width direction of the feature map, a height direction of the feature map, or a channel direction of the feature map.

The processor 100 may shift the position of the portion of the data by performing padding on the row or column of the feature map. The processor 100 may perform padding based on a memory bandwidth and a kernel size of the neural network operation.

The processor 100 may shift the position of the portion of the data by a predetermined interval in the row or column of the feature map. The processor 100 may determine the interval based on the memory bandwidth, the kernel size of the neural network operation, and the size of the feature map.

The processor 100 may shift the position based on a lookup table that stores a degree of shifting in the row or column of the feature map. The processor 100 may shift the position based on coordinates of the sets of the data and a special purpose register.

In operation 750, the processor 100 outputs data requested by the neural network operation from the feature map in which the position of the portion of the data is shifted based on the memory bandwidth.

The memory mapping apparatus, and other apparatuses, devices, units, modules, and components described herein with respect to FIGS. 1 and 2, such as the memory mapping apparatus 10, the processor 100, the memory 200, and the executer 300, are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-7 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random-access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A memory mapping method, comprising:
    storing, in a memory, a feature map comprising a plurality of sets of data used for a neural network operation;
    shifting a position of a portion of the data comprised in the feature map that is stored in the memory based on a parameter of the neural network operation; and
    outputting data requested by the neural network operation from the feature map in which the position of the portion of the data is shifted based on a memory bandwidth.

2. The memory mapping method of claim 1, wherein the shifting comprises:
    shifting the position of the portion of the data by a different interval based on a position of a row of the feature map or a position of a column of the feature map.

3. The memory mapping method of claim 1, wherein the shifting comprises:
    shifting the position of the portion of the data by performing padding on a row or a column of the feature map.

4. The memory mapping method of claim 3, wherein the shifting of the position of the portion of the data by performing padding on the row or the column of the feature map comprises:
    performing padding based on the memory bandwidth and a kernel size of the neural network operation.

5. The memory mapping method of claim 1, wherein the shifting comprises:
    shifting data in a row or a column of the feature map by a predetermined interval.

6. The memory mapping method of claim 5, wherein the shifting of the data in the row or the column of the feature map by the predetermined interval comprises:
    determining the interval based on the memory bandwidth, a kernel size of the neural network operation, and a size of the feature map.

7. The memory mapping method of claim 1, wherein the shifting comprises:
    shifting the position of the portion of the data based on a lookup table that stores a degree of shifting in a row or a column of the feature map.

8. The memory mapping method of claim 7, wherein the shifting of the position of the portion of the data based on the lookup table that stores a degree of shifting in the row or the column of the feature map comprises:
    shifting the position of the portion of the data based on coordinates of the sets of the data and a special purpose register.

9. The memory mapping method of claim 1, wherein the shifting comprises:
    shifting the position of the portion of the data based on a stride corresponding to a width direction of the feature map, a height direction of the feature map, or a channel direction of the feature map.

10. A non-transitory computer-readable storage medium storing instructions that, when executed by a processor, cause the processor to perform the image-memory mapping method of claim 1.

11. A memory mapping apparatus, comprising:
    a memory configured to store therein a feature map comprising a plurality of sets of data used for a neural network operation; and
    a processor configured to shift a position of a portion of the data comprised in the feature map that is stored in the memory based on a parameter of the neural network operation, and to output data requested by the neural network operation from the feature map in which the position of the portion of the data is shifted based on a memory bandwidth.

12. The memory mapping apparatus of claim 11, wherein the processor is configured to:
    shift the position of the portion of the data by a different interval based on a position of a row of the feature map or a position of a column of the feature map.

13. The memory mapping apparatus of claim 11, wherein the processor is configured to:
    shift the position of the portion of the data by performing padding on a row or a column of the feature map.

14. The memory mapping apparatus of claim 13, wherein the processor is configured to:
    perform padding based on the memory bandwidth and a kernel size of the neural network operation.

15. The memory mapping apparatus of claim 11, wherein the processor is configured to:
    shift data in a row or a column of the feature map by a predetermined interval.

16. The memory mapping apparatus of claim 15, wherein the processor is configured to:
    determine the interval based on the memory bandwidth, a kernel size of the neural network operation, and a size of the feature map.

17. The memory mapping apparatus of claim 11, wherein the processor is configured to:
    shift the position of the portion of the data based on a lookup table that stores a degree of shifting in a row or a column of the feature map.

18. The memory mapping apparatus of claim 17, wherein the processor is configured to:
    shift the position of the portion of the data based on coordinates of the sets of the data and a special purpose register.

19. The memory mapping apparatus of claim 11, wherein the processor is configured to:
    shift the position of the portion of the data based on a stride corresponding to a width direction of the feature map, a height direction of the feature map, and a channel direction of the feature map.

* * * * *